(12) United States Patent
Takiguchi

(10) Patent No.: US 9,524,019 B2
(45) Date of Patent: Dec. 20, 2016

(54) IMAGE PROCESSING APPARATUS, IMAGE PROCESSING METHOD, STORAGE MEDIUM, AND PROGRAM

(71) Applicant: CANON KABUSHIKI KAISHA, Tokyo (JP)

(72) Inventor: Hideo Takiguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 663 days.

(21) Appl. No.: 13/835,023

(22) Filed: Mar. 15, 2013

(65) Prior Publication Data

US 2013/0201220 A1   Aug. 8, 2013

Related U.S. Application Data

(63) Continuation of application No. 09/848,372, filed on May 4, 2001, now Pat. No. 8,429,563.

(30) Foreign Application Priority Data

May 16, 2000 (JP) .................................. 2000-143206

(51) Int. Cl.
*G06F 3/00* (2006.01)
*H04N 1/00* (2006.01)

(52) U.S. Cl.
CPC ............ *G06F 3/005* (2013.01); *H04N 1/0014* (2013.01); *H04N 1/0045* (2013.01);
(Continued)

(58) Field of Classification Search
CPC ...... G06F 3/14; G06F 3/167; G06F 17/30861; G06F 2203/04801; G06F 3/04812; G06F 3/1454; G06F 3/048; G06F 3/0481; G06F 3/0484; G06F 3/04842; G06F 21/86; G06F 2212/2022; G06F 12/0866; G06F 1/1626; G06F 21/79; G06F 2221/2129

See application file for complete search history.

(56) References Cited

U.S. PATENT DOCUMENTS 5,153,729 A * 10/1992 Saito .................... H04N 1/2158
                                              348/231.6
5,459,830 A    10/1995 Ohba et al.
(Continued)

FOREIGN PATENT DOCUMENTS

JP    02-202766 A    8/1990
JP    11-259630 A    9/1999
(Continued)

OTHER PUBLICATIONS

Brinck et al., The desing of Banking Websites: Lessons from Interative design; © 1998; IEEE; 6 pages.*
(Continued)

*Primary Examiner* — Linh K Pham
(74) *Attorney, Agent, or Firm* — Fitzpatrick, Cella, Harper & Scinto

(57) ABSTRACT

It is difficult appropriately to select only a favorite image in a list display screen of small images such as a thumbnail image. An image processing apparatus is provided that has, in various embodiments, one or more of the features of an indicator for indicating a reduced image to be subjected to a specific image processing among displayed reduced images; a display controller for displaying an image in a size larger than the size of the reduced image indicated by the indicator; and an executor for executing the specific image processing on the stored image after the mentioned display controller displays the image in the size larger than the size of the reduced image.

14 Claims, 14 Drawing Sheets

(52) U.S. Cl.
CPC ..... *H04N 1/00167* (2013.01); *H04N 1/00188* (2013.01); *H04N 1/00442* (2013.01); *H04N 1/00453* (2013.01); *H04N 1/00458* (2013.01); *H04N 1/00461* (2013.01); *H04N 1/00132* (2013.01); *H04N 2201/325* (2013.01)

(56) References Cited

U.S. PATENT DOCUMENTS

| | | |
|---|---|---|
| 5,680,558 A | 10/1997 | Hatanaka et al. |
| 5,752,053 A | 5/1998 | Takakura et al. |
| 5,774,235 A | 6/1998 | Arakawa et al. |
| 5,819,261 A | 10/1998 | Takahashi et al. |
| 5,898,436 A | 4/1999 | Stewart et al. |
| 6,018,744 A | 1/2000 | Mamiya et al. |
| 6,215,523 B1* | 4/2001 | Anderson .......... H04N 1/00384 348/333.05 |
| 6,373,507 B1* | 4/2002 | Camara et al. ................ 715/825 |
| 6,400,853 B1* | 6/2002 | Shiiyama ..................... 382/305 |
| 6,441,854 B2* | 8/2002 | Fellegara ................. 348/333.01 |
| 6,476,929 B1* | 11/2002 | Tanaka .............. G06F 17/30067 358/1.1 |
| 6,549,304 B1* | 4/2003 | Dow ..................... G06F 9/4446 358/444 |
| 6,657,702 B1 | 12/2003 | Chui et al. |
| 6,680,749 B1* | 1/2004 | Anderson .......... H04N 1/32128 348/231.99 |
| 6,715,003 B1 | 3/2004 | Safai |
| 6,801,327 B1* | 10/2004 | Haneda ............. G06F 17/30265 358/1.1 |
| 7,193,646 B1* | 3/2007 | Shioji .............. G06F 17/30274 345/157 |
| 2002/0032677 A1* | 3/2002 | Morgenthaler ... G06F 17/30781 |
| 2002/0038299 A1* | 3/2002 | Zernik .............. G06F 17/30017 |
| 2004/0210845 A1* | 10/2004 | Paul ........................ G06F 17/24 715/731 |
| 2005/0097477 A1* | 5/2005 | Camara ................. G06F 3/0481 715/825 |
| 2005/0231611 A1* | 10/2005 | Anderson ........... G06F 17/3025 348/231.2 |
| 2009/0207254 A1* | 8/2009 | Tomat .................. G06F 3/0481 348/207.1 |
| 2011/0214045 A1 | 9/2011 | Sumier et al. |
| 2014/0132782 A1* | 5/2014 | Tomat .................. G06F 3/0481 348/207.1 |

FOREIGN PATENT DOCUMENTS

| | | |
|---|---|---|
| JP | 11-355706 A | 12/1999 |
| JP | 2000-083221 A | 3/2000 |
| JP | 2001-230992 A | 8/2001 |
| JP | 2001-313885 A | 11/2001 |
| KR | 10-200839 A | 7/1998 |

OTHER PUBLICATIONS

Screenshots of ACDSee of ACDsystems (Version 2.3 1998), XP-002284101.

Screenshots of Irfanview (Version 3.17, Release date: Apr. 22, 2000), XP-002284102.

Decision on Appeal issued Sep. 27, 2012 in parent U.S. Appl. No. 09/848,372.

Adobe Inc; Adobe® Bridge Help and tutorials; 2012, http://helpx.adobe.com/pdf/bridge_reference.pdf.

* cited by examiner

| No. | FILE PATH NAME | PRINTING DESIGNATION | MAIL DESIGNATION |
|---|---|---|---|
| 1 | C : ¥Photos¥100-1010.JPG | OFF | OFF |
| 2 | C : ¥Photos¥100-1011.JPG | OFF | OFF |
| 3 | C : ¥Photos¥100-1205.JPG | OFF | OFF |
| ⋮ | ⋮ | ⋮ | ⋮ |
| N | C : ¥Photos¥101-1034.JPG | OFF | OFF |

IMAGE PROCESSING APPARATUS, IMAGE PROCESSING METHOD, STORAGE MEDIUM, AND PROGRAM

RELATED APPLICATIONS

This application is a continuation of application Ser. No. 09/848,372, filed May 4, 2001. It claims benefit of that application under 35 U.S.C. §120, and claims benefit under 35 U.S.C. §119 of Japanese Patent Application No. 2000-143206, filed on May 16, 2000. The entire contents of each of the mentioned prior applications are incorporated herein by reference.

BACKGROUND OF THE INVENTION

Field of the Invention

The present invention relates to a technique of transferring an image to a computer from a digital camera or another apparatus, for storing the image, and printing or e-mailing the image.

Related Background Art

In recent years, with the spread of digital cameras, it has become easy to photograph a large amount of images and to store the images in a personal computer (PC), and to print them by oneself, or to attach them to an e-mail and mail them.

Accordingly, a large number of pieces of image management software have been brought on sale, by which the image can be managed with a PC, printed and attached to an e-mail.

A representative example of the image management software is shown in FIG. 1. In this manner, when a folder containing an image to be displayed is selected from section 1, an image file in the folder is displayed in a thumbnail form (an image obtained by reducing in size and displaying the original image) in section 2, so that a user can easily see a large number of images at once. In this case, when a certain thumbnail image is selected and double-clicked in a section 3, the image can be enlarged and displayed in a separate window. Moreover, when a certain thumbnail is selected and printing is designated, the printing of the image can be executed. Furthermore, when a certain thumb nail is selected and "e-mailing" is designated, mail software is started and the image file is automatically attached to an e-mail.

FIG. 2 shows an example of a printing designation window.

A plurality of thumb nails are selected and "print . . . " is selected from a menu or the like. Then, the window of FIG. 2 appears. Here, selected thumbnail images 207 are arranged and displayed. A horizontal number of frames x a vertical number of frames of images arranged in a sheet can be designated with frame number designations 201, 202. When the selected images are arranged in more than one sheet, the images can be checked for confirmation that they are the desired ones by pressing a former page button 204 or a next page button 205. Subsequently, when a print button is pushed, the images are printed according to the layout with a printer.

With the display of the thumbnail form, many images can preferably be seen at a glance, but each image size is small. Therefore, some image management software has a "slide show" function with which a plurality of selected thumbnail images are fully displayed over a screen and can continuously be seen. A first image of the selected images is displayed all over the screen, and the display is changed to the next image display by clicking a mouse or pressing an appropriate key. When this is repeated, the selected images can successively be displayed and seen all over the screen. In this case, the display can be returned to the previous image display by pressing an arrow key "←" or a specific key.

Many images are photographed with a digital camera, stored in the PC, and displayed in a list in the thumbnail form with the image management software. These images include an image out of focus, an image photographed with manual vibration, repeatedly photographed images of a similar scene or the same object, and the like.

In general, in consideration of a PC screen size, the thumbnail is prepared and displayed in a size of about 80×60 dots, or 160×120 dots at most. In this size of display, it is very difficult to distinguish an image that is out of focus, an image that was made during manual vibration, or the like. Moreover, it is also difficult to select a supposedly best photograph from among several repeatedly taken of the similar scene or the same object.

The user wants to print, e-mail or otherwise send a favorite photograph to an acquaintance, but as described above it is difficult to find the photograph from many images in the list display with such thumbnail size. Therefore, the user double-clicks the thumbnails one by one, enlarges and displays each image in a separate window and confirms whether the image is good or bad, or reproduces the images with the aforementioned slide show function to successively check the images. In this case, the user performs an operation of memorizing the favorite image, one returning to the thumbnail display screen, and re-selecting only the favorite image from the screen to print the image or attach the image to the e-mail.

As described above, finally the image is to be printed or attached to the e-mail. However, an operation of checking and selecting the image is not correlated with an operation of printing a result or attaching the result to the e-mail, and this is inconvenient in the user's operation.

SUMMARY OF THE INVENTION

An object of the present invention is to solve one or more of the aforementioned problems.

Moreover, an object of the present invention is to provide an image processing apparatus, image processing method, storage medium, and program which solves the aforementioned disadvantages, can securely or easily judge whether an image is good or band, and can selectively process only the good image.

To achieve these objects, according to the present invention there is provided an image processing apparatus that comprises a capturing unit adapted to capture a reduction image from a storage medium storing storage images, the reduction images respectively corresponding to the storage images. Also provided are a first display control unit that causes a display device to display the reduction images captured by the capturing unit, and a first selection indication unit that selects and indicates those reduction images which are to be subjected to a specific image process, from the reduction images displayed on the display device. A second display control unit causes sequentially display of a larger size image for each of the reduction images indicated the first selection indication unit, and an execution indication unit selects and indicates which of the storage images are to be subjected to the specific image process, by selecting a corresponding larger size image sequentially displayed by the second display control unit. A specifying unit specifies as a group, as a target of the specific image process, the storage images corresponding to the larger size images indicated by the execution indication unit, upon completion of the display by the second display control unit, and the second display control unit performs a slide show display.

Furthermore, in addition to the aforementioned constitution, in the image processing apparatus, the second display control preferably displays the stored image corresponding to the reduced image indicated by the indication means.

Additionally, an object of the present invention is to confirm the image by the display of the second display control means without requiring an intricate operation.

To achieve the object, in addition to the aforementioned constitution, in the image processing apparatus, an indicator for changing the image to be displayed in the display is displayed.

Moreover, in another aspect, the invention is directed to an image processing apparatus that comprises a capturing unit adapted to capture a reduction image stored in a storage medium, a display control unit that causes a display device to switch-display images each larger than the corresponding reduction image captured by the capturing unit, and a registering unit that registers, from among a series of image switch-displayed by the display control unit, the image indicated by a user as a target of a specific process.

Furthermore, an object of the present invention is to smoothly shift to a specific image processing with respect to an image judged to be appropriate for the specific image processing.

To achieve the object, in addition to the aforementioned constitution, the image processing apparatus further comprises execution instruction means for instructing the specific image processing to be actually performed in the image displayed in the display by the second display control means.

In this case, the execution means executes the specific image processing on the image for which the execution is instructed by the execution instruction means.

In another aspect, the invention is an image processing apparatus that comprises a capturing unit that captures images stored in a storage medium, a display control unit that controls so that the captured images are displayed entirely on a display device, and a registering unit that registers, from among a series of images switch-displayed by the display control unit, the image indicated by a user as a target of a specific process.

Further objects and characteristics of the present invention will be apparent upon reading the following description of an embodiment with reference to the drawings.

DETAILED DESCRIPTION OF THE PREFERRED EMBODIMENTS

First Embodiment

Figure 14:
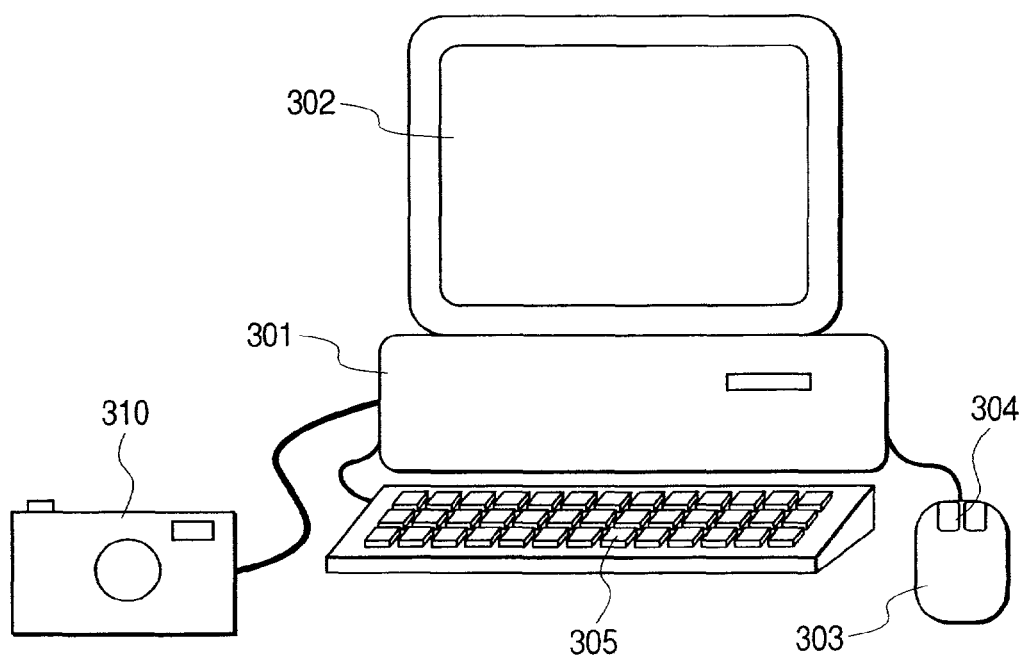
FIG. 14 shows an example of connection of a computer and camera.

FIG. 14 shows a constitution example of a personal computer system as a platform on which the present invention is carried out. In FIG. 14, reference numeral 301 denotes a computer system main body, 302 denotes a display for displaying data, 303 denotes a mouse as a typical pointing device, 304 denotes a mouse button, and 305 denotes a keyboard. A digital camera 310 is connected to the computer system main body via communication cables such as RS-232C and USB types.

Figure 15:
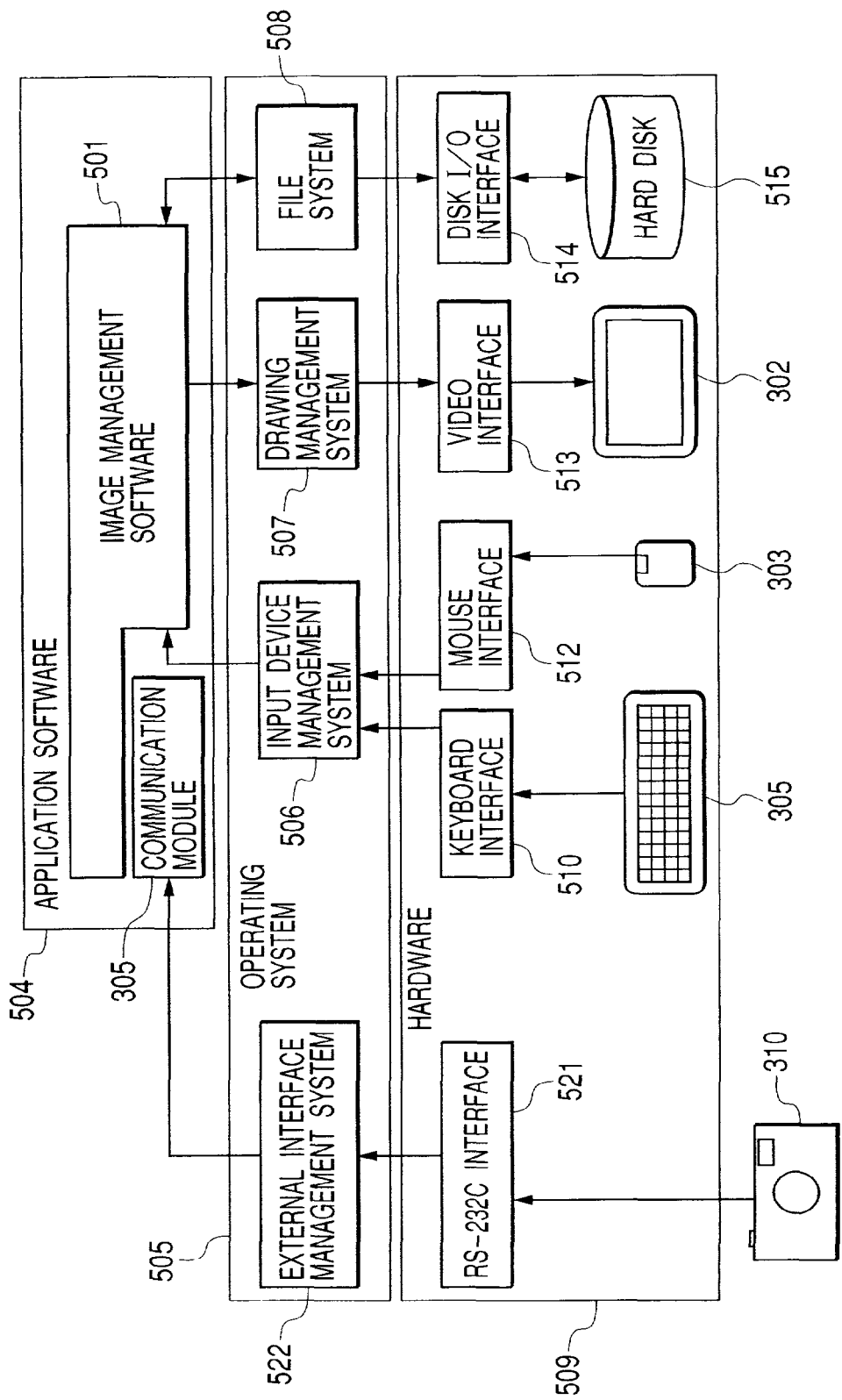
FIG. 15 shows a system constitution example in a preferred embodiment.

FIG. 15 is a diagram showing a constitution of an image data management system including software and hardware. In FIG. 15, reference numeral 509 denotes hardware, 505 denotes an operating system (OS) operating on the hardware 509, and 504 denotes application software operating on the OS 505. Additionally, components of the hardware 509 and OS 505 that are not directly necessary for describing the present embodiment of the present invention is not shown. Examples of such blocks include hardware such as the CPU and memory, a memory management system as the OS, and the like. In FIG. 15, reference numeral 515 denotes a hard disk for physically storing a file and data. A file system 508 constituting the OS has a function for allowing the application software to input/output the file regardless of the particular hardware. A disk IO interface 514 is disposed such that the file system 508 performs reading/writing of the hard disk 515. A drawing management system 507 constituting the OS has a function for allowing the application software to perform drawing regardless of the particular hardware. Reference numeral 513 denotes a video interface for allowing the drawing management system 507 to perform the drawing in the display 302. An input device management system 506 constituting the OS has a function for allowing the application software to receive a user's input regardless of the particular hardware. Reference numeral 510 denotes a keyboard interface for allowing the input device management system 506 to receive the input of the keyboard 305, and 512 denotes a mouse interface for allowing the input device management system 506 to receive the input from the mouse 303. The digital camera 301 is connected via RS-232C cable in the present example. The digital camera is managed by an external interface management system 522 via an RS-232C interface 521. The communication module 305 performs communication with this external interface management system. An image management software 501 uses this communication module to exchange image data and information with the camera.

Figure 13:
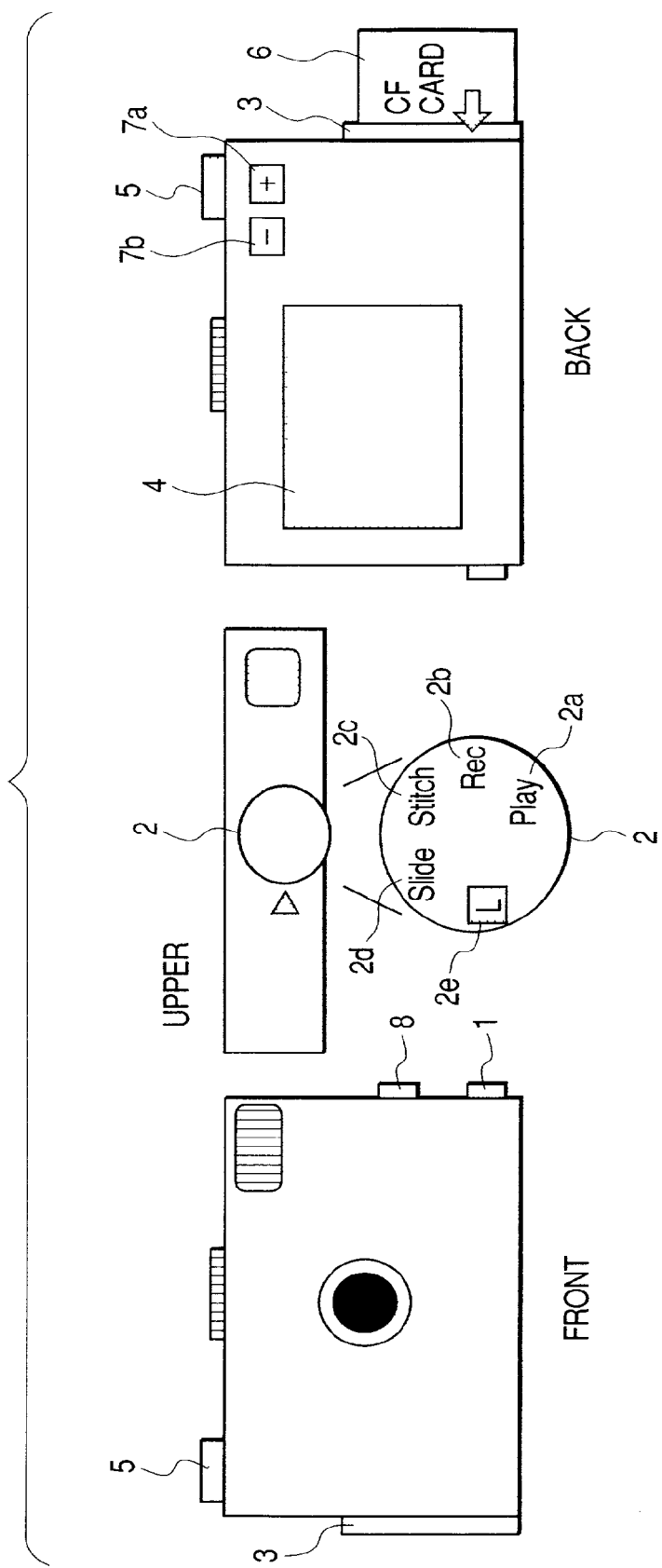
FIG. 13 shows an example of a digital camera.

FIG. 13 shows an example of the digital camera. A USB I/F 1 is connected to the PC. A mode dial switch 2 has a play mode 2a, photography mode 2b, stitch assist mode 2c, slide show reproduction mode 2d, and power off 2e. Reference numeral 3 denotes a compact flash TM (CF) card slot. When only a camera main body is used, the mode dial switch is turned to another mode from the power off, and on the power being turned on, that mode is operational. In the photography mode, an image preview is displayed in an LCD 4. When a release switch 5 is pushed, the image is photographed and recorded in a CF card 6. In the play mode, the last photographed and recorded image is displayed in the LCD, and the image is successively fed and reproduced by +-buttons 7a, 7b.

An operation procedure in which the user selects the image, performs slide show reproduction and subsequently prints the image will next be described.

Figure 1:
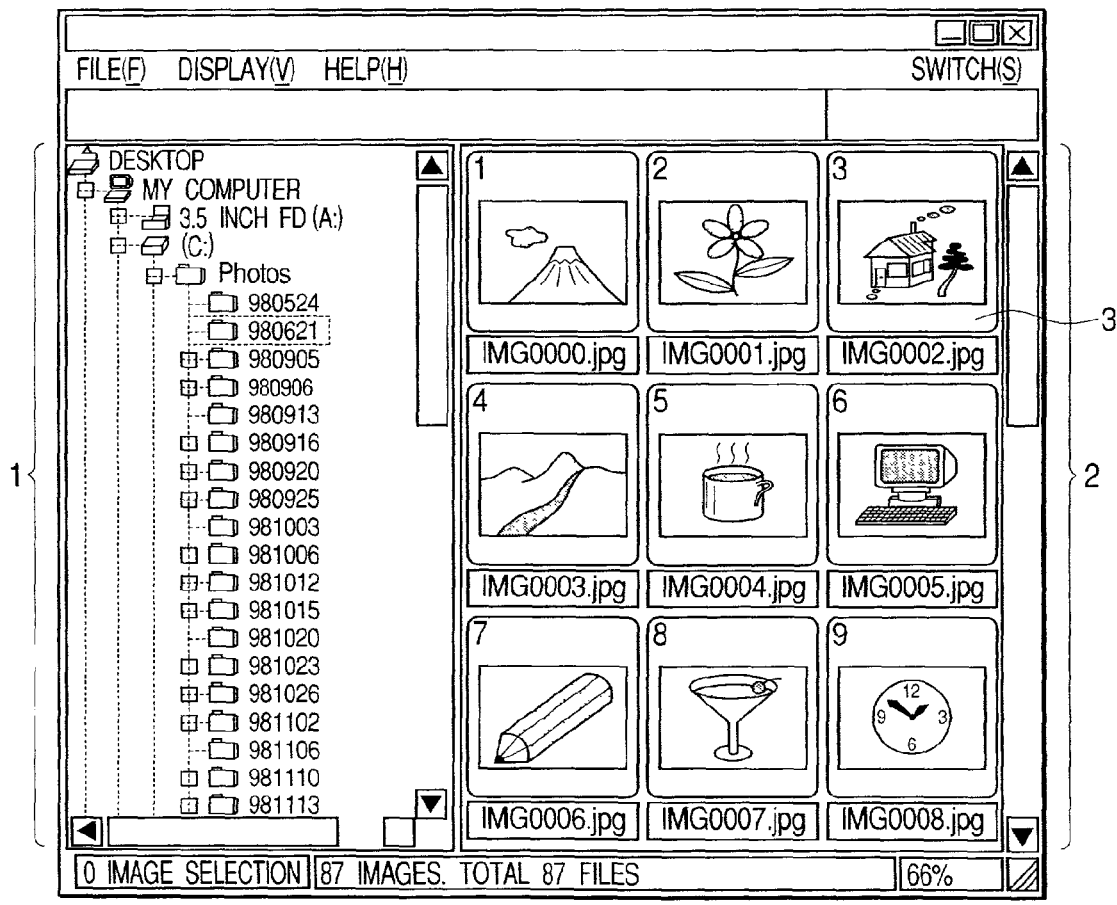
FIG. 1 shows an example of a display screen of a thumbnail of image management software.

The user selects a thumb nail for the slide show reproduction in the thumb nail display screen of FIG. 1. In a selecting method, when "select all" is designated from the menu, all thumbnails are brought to a selected state. In the selected state, a frame color of the thumbnail turns to red, blue or another color. When a plurality of thumbnails are continuously selected from the thumbnail in a certain place, the first thumbnail is clicked and brought to the selected state. Thereafter, the last thumbnail is clicked while pushing SHIFT key. Then, the thumbnails including intermediate thumbnails are in the selected state. Moreover, when a plurality of arbitrary thumbnails are selected, CTRL key is pushed, and simultaneously the thumbnails are clicked. Then, only the clicked thumbnails are in the selected state.

Figure 3:
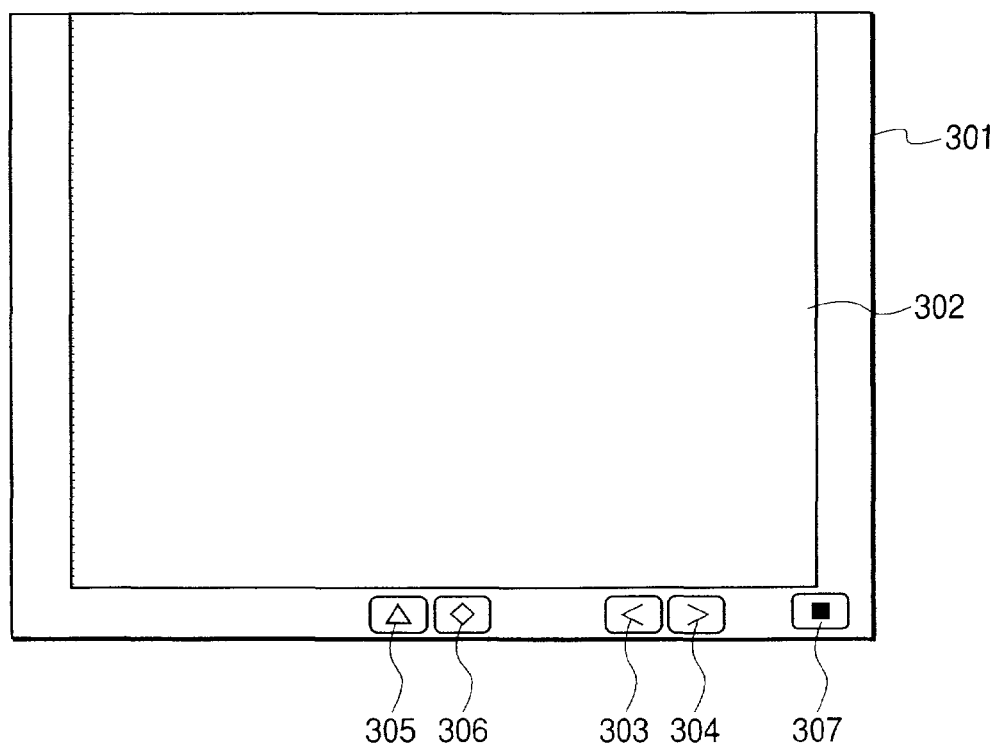
FIG. 3 shows an example of a slide show window.

After the thumbnails to be subjected to slide show reproduction is selected, "slide show . . . " is selected from the menu. Then, the slide show screen is displayed in the whole screen of the computer 302 of FIG. 14 as shown in FIG. 3. In this case, since the thumbnail display screen of FIG. 1 is positioned in a back of the slide show reproduction screen. Therefore, the thumbnail display screen cannot be displayed or operated.

In FIG. 3, reference numeral 301 denotes the whole screen, and 302 denotes a displayed image. When a "back" button 303 is pushed, the displayed image can be returned to the previous image. When a "next" button 304 is pushed, the display can advance to the display of the next image. To advance to the next image, instead of this button, the mouse may be clicked, or a space key or an arrow 6 key may be pushed in the same manner. Moreover, to return to the previous image, the display can also be returned with an arrow 7 key.

Reference numeral 305 denotes a printing designation button. When the user sees the image, and wants to print the image, the user pushes the printing designation button. Then, a designation end mark is displayed on the button as shown by 402 of FIG. 4. This indicates that the user has designated the printing of the image. When the button is pushed once again, the printing designation is canceled, and the display returns to 401. When the user successively displays and checks the image, and finds the image to be printed, the user designates the printing of the image.

When an end button 307 is pushed, the slide show reproduction is ended, the screen 301 disappears, and the original thumbnail display screen shown in FIG. 1 returns. In this case, when the printing of even one image is designated in the slide show screen, a printing window shown in FIG. 2 automatically starts, and the user can enter an operation for continuously printing the images.

An inner processing procedure will be described along a flow of a series of operations.

Figures 4, 5:
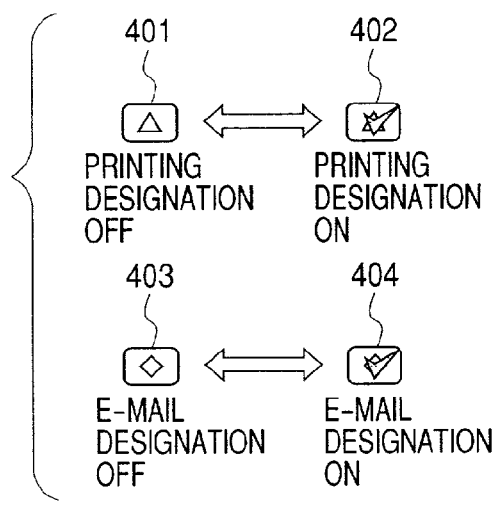
FIG. 4 shows an example of a printing designation button, and of an e-mail designation button.
FIG. 5 shows a management list of selected images.

When the slide show reproduction screen is started, a list of selected images shown in FIG. 5 is transferred from the thumbnail display screen. In this list, an image file path name is stored, and values for the printing designation are all stored with initial value Off designation.

Figure 6:
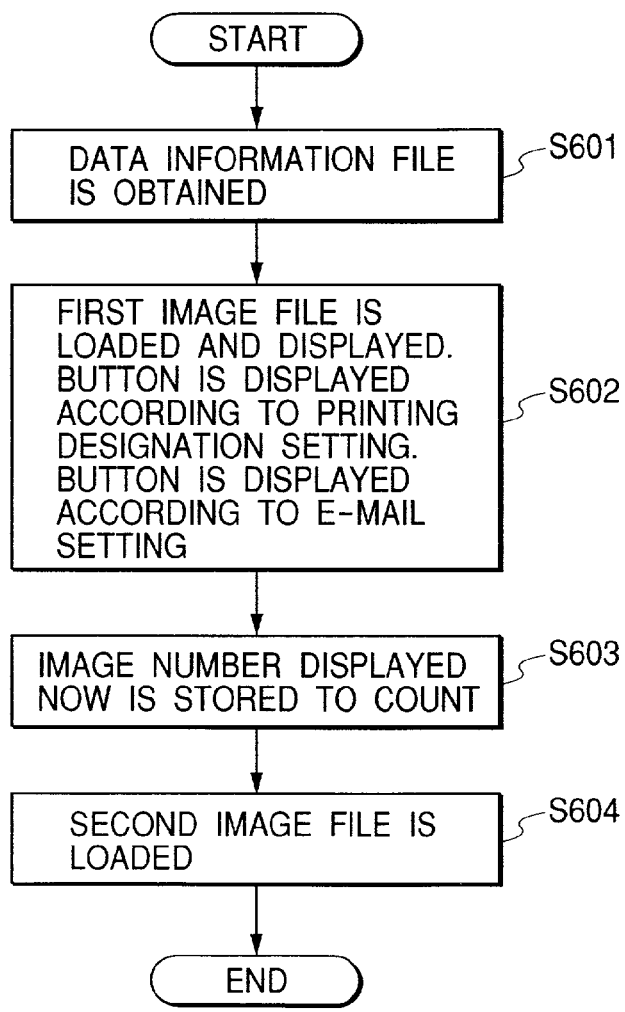
FIG. 6 shows a procedure for starting a slide show reproduction screen.

For the slide show reproduction screen, a procedure shown in FIG. 6 is performed.

In step 601 the list is obtained, and in step 602 an image file No. 1 of the list is loaded and displayed. Subsequently, the buttons 401 and 402 of FIG. 4 are displayed in accordance with the value of print designation of the list shown in FIG. 5. In this case, since the initial value is Off, the button 401 is displayed. In step 603 the first image being displayed is stored in a variable COUNT. Subsequently, (COUNT+1)-th image file is loaded. Thereby, the image can quickly be displayed for the next image display.

Figure 7:
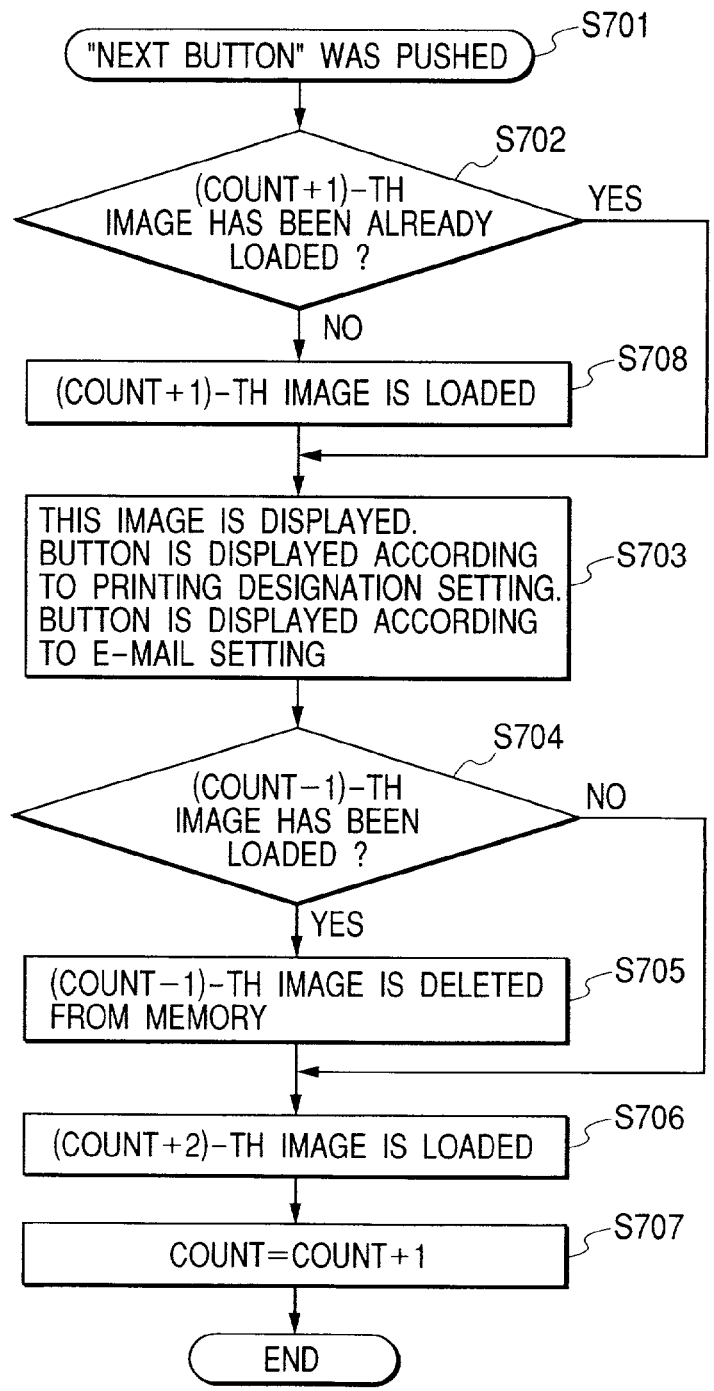
FIG. 7 shows a processing procedure for a pushed "next" button.

When the "next" button 304 of FIG. 3 is pushed, a processing shown in FIG. 7 is performed.

It is checked in step 702 whether a (COUNT+1)-th image to be displayed has already been loaded. When the image is not loaded, the image is loaded in step 708. Subsequently in step 703, the image is displayed in the screen. Moreover, the button 401 or 402 of FIG. 4 is displayed in accordance with the printing designation value of the list shown in FIG. 5. It is checked in step 704 whether the (COUNT+1)-th image is in a memory. If the image is in the memory, the image is deleted in step 705. Next in step 706 a (COUNT+2)-th image is loaded, and in step 707 COUNT value is increased by one. In this case, the previous and next images to the image being displayed are loaded in the memory, and thus when the "back" or "next" button is pushed, the corresponding image can quickly be displayed.

Figure 8:
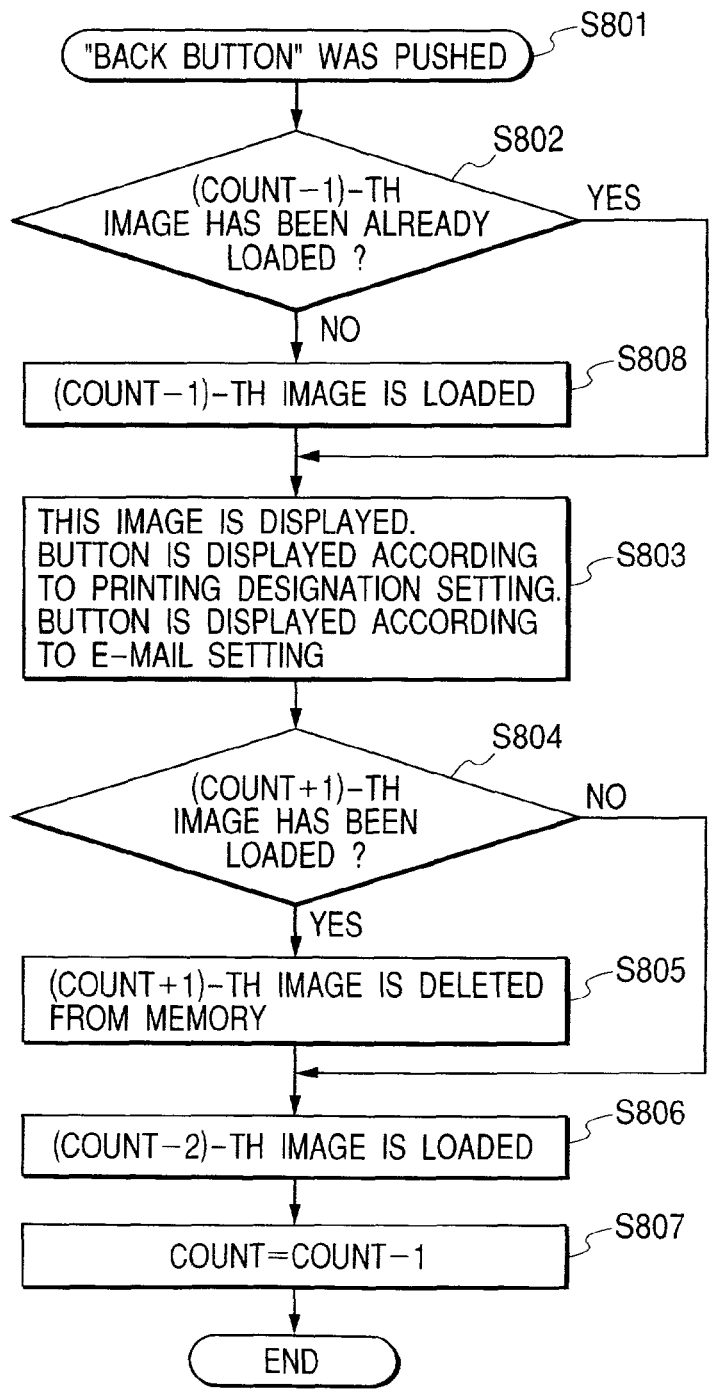
FIG. 8 shows a processing procedure for a pushed "back" button.

When the back button 303 of FIG. 3 is pushed, a processing shown in FIG. 8 is performed.

It is checked in step 802 whether a (COUNT−1)-th image to be displayed has already been loaded. When the image is not loaded, the image is loaded in step 808. Subsequently in step 803, the image is displayed in the screen. Moreover, the button 401 or 402 of FIG. 4 is displayed in accordance with the printing designation value of the list shown in FIG. 5. It is checked in step 804 whether the (COUNT+1)-th image is in the memory. If the image is in the memory, the image is deleted in step 805. Next in step 806 a (COUNT−2)-th image is loaded, and in step 807 the COUNT value is decreased by one. In this case, the previous and next images to the image being displayed are loaded in the memory, and so when the "back" or "next" button is pushed, the corresponding image can quickly be displayed.

Figure 9:
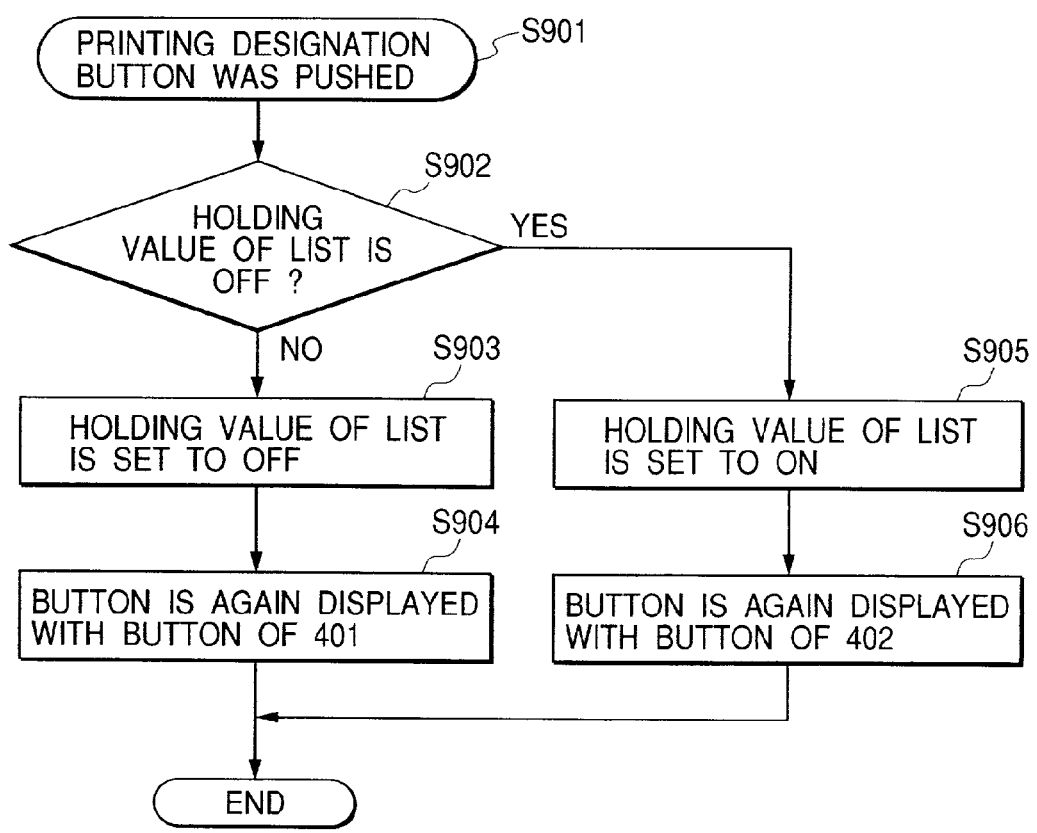
FIG. 9 shows a processing procedure for a pushed printing designation button.

When the printing designation button is pushed, a processing shown in FIG. 9 is performed.

In step 902 a state before the button is pushed is obtained from the list of FIG. 5. If in step 903 or 905 a list holding value is Off, the value is set to On. If the value is On, the value is set to Off. Subsequently in step 904 or 906, the button is again displayed in accordance with the setting.

When the user pushes the end button 301 of FIG. 3, the slide show screen ends, and the thumbnail display screen of FIG. 1 returns.

Figure 11:
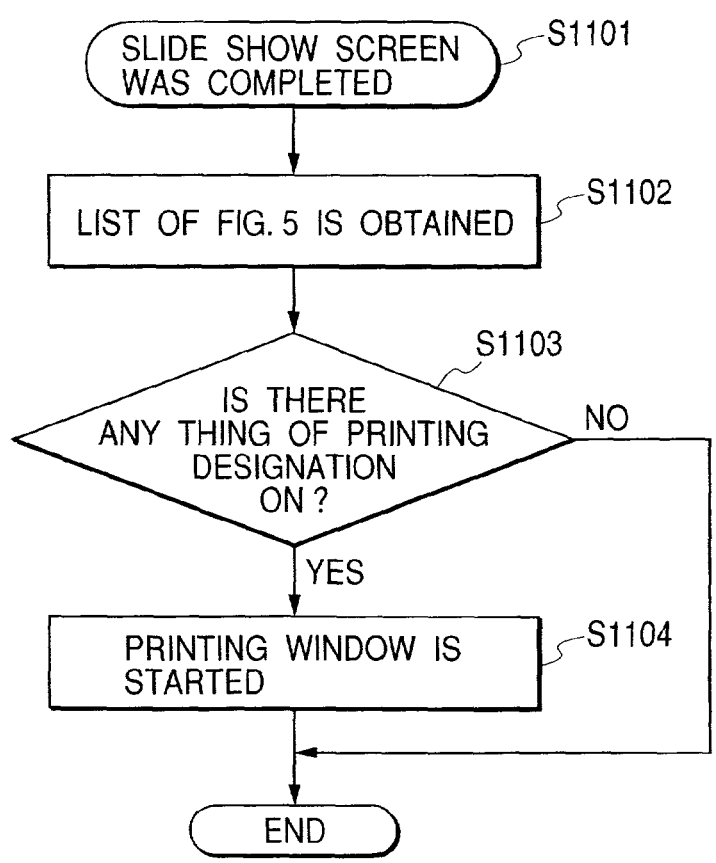
FIG. 11 shows a procedure until a print window is started.

In the thumbnail display screen, a processing shown in FIG. 11 is performed.

Figure 2:
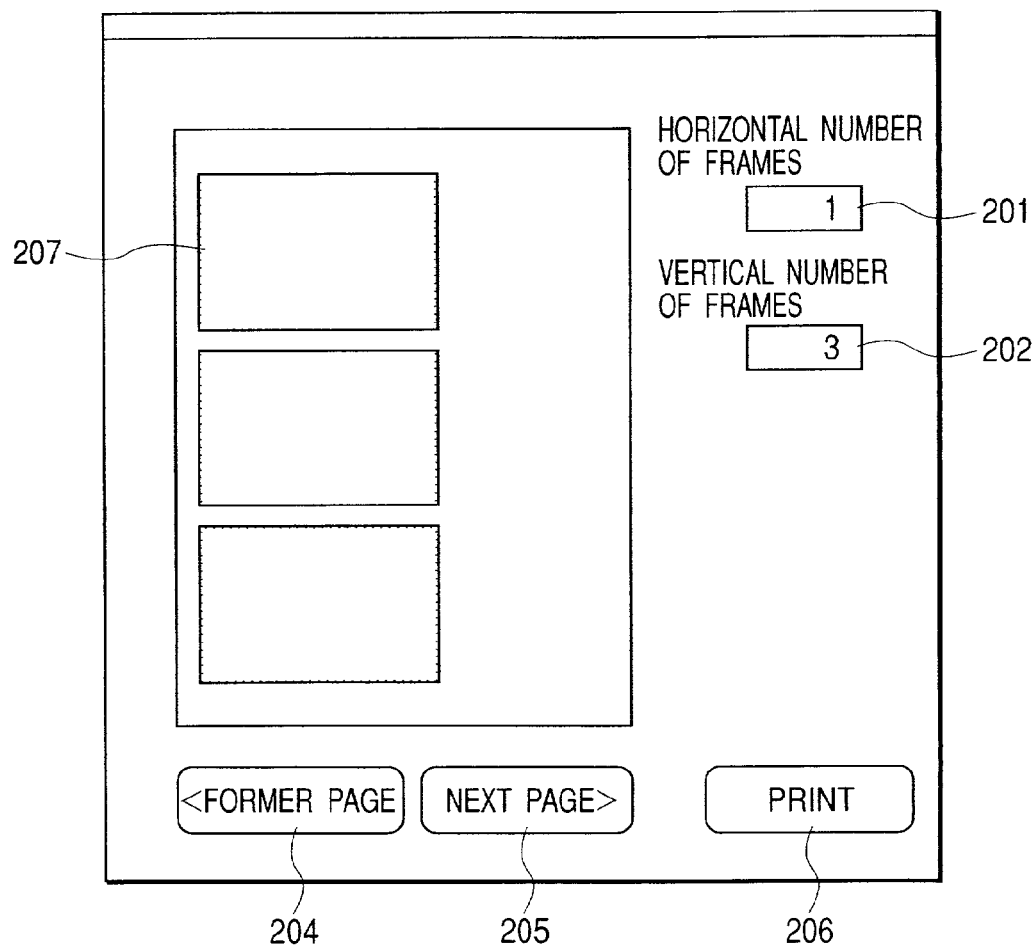
FIG. 2 shows an example of a print window.

It is checked in step 1102 whether there is any "On" in the column of printing designation of the list shown in FIG. 5. If there is even one "On", the printing window of FIG. 2 is started in step 1104. In the printing window, the path name of the image file having "On" in the list of FIG. 5 is obtained, the image is loaded, and the image is used as the displayed image 207 or the image whose printing is executed by pushing the print button 206.

Second Embodiment

In the first embodiment, the example for performing the printing designation in the slide show screen and subsequently automatically starting the printing window has been described. In a second embodiment, an example for designating an image to be attached to the e-mail in the slide show screen and subsequently automatically starting e-mail software will be shown.

The user selects a thumbnail for the slide show reproduction in the thumbnail display screen of FIG. 1. In a selecting method, when "select all" is designated from the menu, all thumbnails are brought to a selected state. In the selected state, a frame color of the thumbnail turns to red, blue or another color. When a plurality of thumbnails are continuously selected from the thumbnail in a certain place, the first thumbnail is clicked and brought to the selected state. Thereafter, the last thumbnail is clicked while pushing SHIFT key. Then, the thumbnails including intermediate thumbnails are in the selected state. Moreover, when a plurality of arbitrary thumbnails are selected, CTRL key is pushed, and simultaneously the thumbnails are clicked. Then, only the clicked thumbnails are in the selected state.

After the thumbnail to be subjected to the slide show reproduction is selected in this manner, "slide show . . . " is selected from the menu. Then, the slide show screen is displayed in the whole screen of the computer 302 of FIG. 14 as shown in FIG. 3. In this case, since the thumbnail display screen of FIG. 1 is positioned in the back of the slide show reproduction screen. Therefore, the thumbnail display screen cannot be displayed or operated.

In FIG. 3, reference numeral 301 denotes the whole screen, and 302 denotes the displayed image. When the back button 303 is pushed, the display can be returned to the previous image. When the next button 304 is pushed, the display can advance to the display of the next image. To advance to the next image, instead of this button, the mouse may be clocked, or the space key or the arrow 6 key may be pushed in the same manner. Moreover, to return to the previous image, the display can also be returned with the arrow 7 key.

Reference numeral 306 denotes an e-mail designation button. When the user sees the image, and wants to attach the image to the e-mail, the user pushes this button. Then, the designation end mark is displayed on the button as shown by 404 of FIG. 4, and this informs the user of the e-mail designation. When the button is pushed once again, the e-mail designation is canceled, and the display returns to 403. When the user successively displays and checks the image, and finds the image to be attached to the e-mail, the user designates the attaching of the image.

When the end button 307 is pushed, the slide show reproduction is ended, the screen 301 disappears, and the original thumbnail display screen shown in FIG. 1 returns. In this case, when the e-mail of even one image is designated in the slide show screen, e-mail software automatically starts, and a new mail with the image attached thereto is displayed.

The inner processing procedure will be described along the flow of a series of operations.

When the slide show reproduction screen is started, the list of selected images shown in FIG. 5 is transferred from the thumbnail display screen. In this list, the image file path name is stored, and values for the e-mail designation are all stored with initial value Off designation.

For the slide show reproduction screen, the procedure shown in FIG. 6 is performed.

In step 601 the list is obtained, and in step 602 the image file No. 1 of the list is loaded and displayed. Subsequently, the buttons 403 and 404 of FIG. 4 are displayed in accordance with the value of e-mail designation of the list shown in FIG. 5. In this case, since the initial value is Off, the button 403 is displayed. In step 603 the first image being displayed is stored in the variable COUNT. Subsequently, (COUNT+1)-th image file is loaded. Thereby, the image can quickly be displayed for the next image display.

When the next button 304 of FIG. 3 is pushed, the processing shown in FIG. 7 is performed.

It is checked in step 702 whether the (COUNT+1)-th image to be displayed has already been loaded. When the image is not loaded, the image is loaded in step 708. Subsequently in step 703, the image is displayed in the screen. Moreover, the button 403 or 404 of FIG. 4 is displayed in accordance with the e-mail designation value of the list shown in FIG. 5. It is checked in step 704 whether the (COUNT−1)-th image is in the memory. If the image is in the memory, the image is deleted in step 705. Next in step 706 the (COUNT+2)-th image is loaded, and in step 707 COUNT value is increased by one. In this case, the previous and next images to the image being displayed are loaded in the memory, and thus when the "back" or "next" button is pushed, the corresponding image can quickly be displayed.

When the back button 303 of FIG. 3 is pushed, the processing shown in FIG. 8 is performed.

It is checked in step 802 whether the (COUNT−1)-th image to be displayed has already been loaded. When the image is not loaded, the image is loaded in step 808. Subsequently in step 803, the image is displayed in the screen. Moreover, the button 403 or 404 of FIG. 4 is displayed in accordance with the e-mail designation value of the list shown in FIG. 5. It is checked in step 804 whether the (COUNT+1)-th image is in the memory. If the image is in the memory, the image is deleted in step 805. Next in step 806 the (COUNT−2)-th image is loaded, and in step 807 the COUNT value is decreased by one. In this case, the previous and next images to the image being displayed are loaded in the memory, and so when the "back" or "next" button is pushed, the corresponding image can quickly be displayed.

Figure 10:
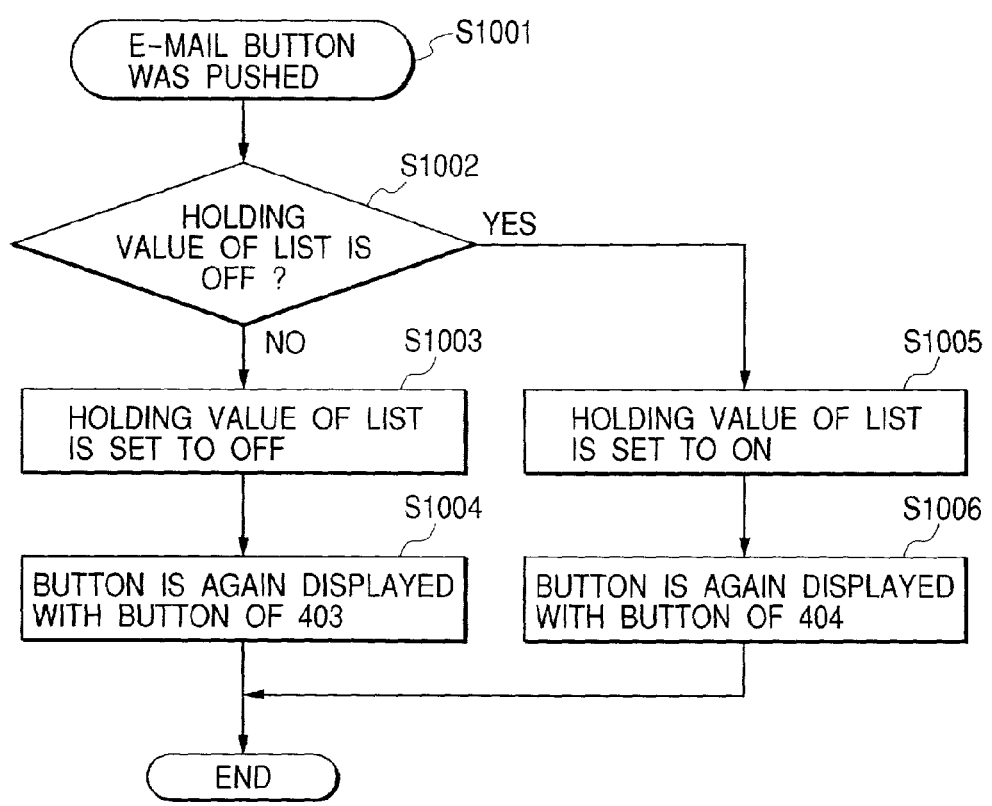
FIG. 10 shows a processing procedure for a pushed e-mail button.

When the e-mail designation button is pushed, the processing shown in FIG. 10 is performed.

In step 1002 a state before the button is pushed is obtained from the list of FIG. 5. If in step 1003 or 1005 the list holding value is Off, the value is set to On. If the value is On, the value is set to Off. Subsequently in step 1004 or 1006, the button is again displayed in accordance with the setting.

When the user pushes the end button 301 of FIG. 3, the slide show screen ends, and the thumbnail display screen of FIG. 1 returns.

Figure 12:
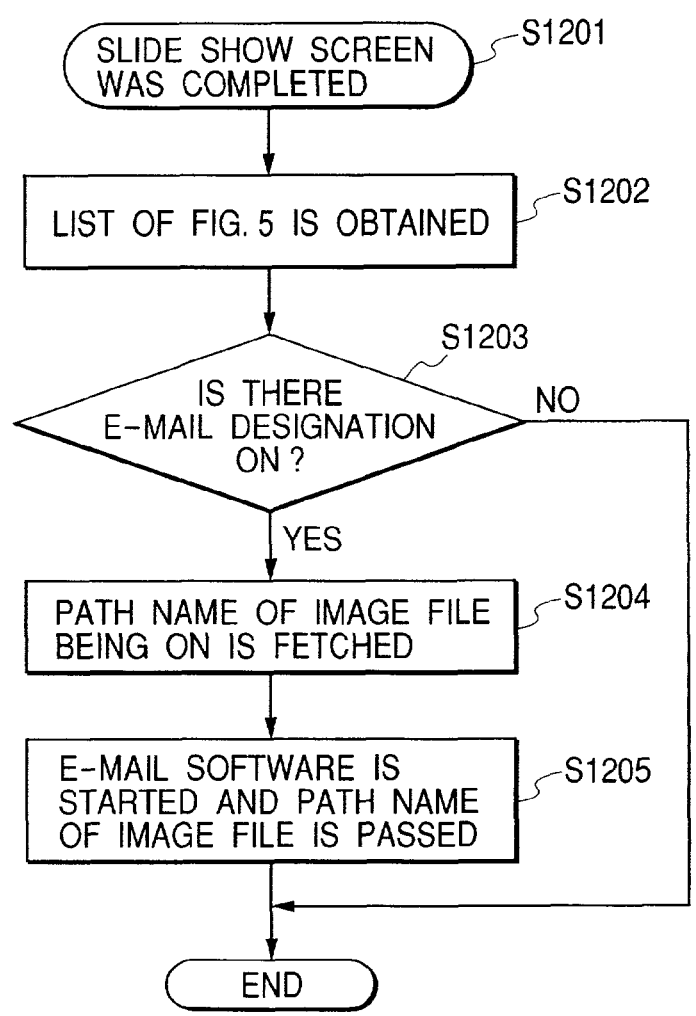
FIG. 12 shows a procedure until e-mail software is started.

In the thumbnail display screen, the processing shown in FIG. 12 is performed.

It is checked in step 1202 whether there is any "On" in the column of e-mail designation of the list shown in FIG. 5. If there is even one "On", in step 1204 the path name of the image file with the e-mail"On" is obtained. In step 1205 the e-mail software is started and the path name of the image file is passed. In the e-mail software, a new mail screen is displayed, and these image files are attached.

Third Embodiment

In the first and second embodiments, in order to reproduce the slide show, the display advances to the next image in response to the user's clear instruction, the end button 301 of FIG. 3 is pushed, and the slide show screen is ended.

As another mode of slide show, the image is displayed for a given time, and subsequently the display is automatically successively changed to that of the next image. In this case, after the last image is display, and the given time elapses, the slide show screen automatically ends.

In this case, while the image is displayed for the given time such as five or ten seconds, the printing designation button or the e-mail designation button is pushed, and thereby the designation can be performed similarly as the first and second embodiment. When the display of the last image ends, the slide show screen automatically ends. When there is the printing designation or the e-mail designation, the printing window or the e-mail software is automatically displayed.

Additionally, the present invention can preferably be applied not only to printing and mail transmission but also to a use mode in which the image is transferred, for example, to the computer from the digital camera. For a storage medium of the digital camera, the number of frames of stored images is limited. Therefore, it is necessary to frequently transfer or delete the image in the storage medium.

The present invention is also preferable in a storage region change processing for transferring the image in this manner.

Moreover, in the aforementioned embodiments, after the printing or other processing is indicated with a reduced image, an original stored image corresponding to the indicated reduced image is displayed as largely as possible in the screen, but this feature is not limited to these possibilities. In order to display the contents of the reduced image such that the content is more easily recognized, an image larger than the reduced image may be displayed.

Moreover, at least a part or the whole of the reduced image may be enlarged and displayed.

Additionally, the present invention may be applied to a system constituted of a plurality of apparatuses (e.g., a host computer, interface apparatus, reader, printer, and the like), or to an apparatus constituted of one unit (e.g., a copying machine, facsimile machine).

Moreover, a program code of software for realizing the aforementioned embodiment function is supplied to an apparatus connected to various devices or a computer in a system in such a manner that various devices are operated to realize the aforementioned embodiment function. The system or the apparatus computer (CPU or MPU) is operated by operating various devices according to the stored program. The invention carried out in this manner is also included in a category of the present invention.

Furthermore, in this case, the program code itself of the software realizes the function of the aforementioned embodiment. The program code itself, and means for supplying the program code to the computer, for example the storage medium with the program code stored therein constitute the present invention.

Examples of such a storage medium with the program code stored therein include a floppy disk, hard disk, optical disk, magnetic optical disk, CD-ROM, magnetic tape, non-volatile memory card, ROM, and the like.

Moreover, when the computer executes the supplied program code, the aforementioned embodiment function is realized. Additionally, the program code cooperates with an operating system (OS) operating in the computer, another application software, or the like, and the aforementioned embodiment function is realized. In this case as well, needless to say, the program code is included in the embodiment of the present invention.

As described above, when designation means is disposed in the slide show display, first the user displays the image in a large size, can judge whether the image is good or band, and can selectively process only the good image. Moreover, the image selected in this manner is printed or attached to the e-mail according to the user's final object. This operation can continuously be performed without being interrupted.

Moreover, the image processing apparatus of the present invention includes: take-in means for taking in a reduced image from a storage medium in which a stored image and the reduced image corresponding to the stored image are stored; first display control means for displaying the reduced image taken by the take-in means in a display; indication means for indicating the reduced image to be subjected to a specific image processing from the reduced image displayed in the display; second display control means for displaying the reduced image indicated by the indication means in such a manner that the image is more easily recognized; and execution means for executing the specific image processing on the stored image after the second display control means displays the image. Therefore, the image which should not be processed can be prevented from being incorrectly indicated by the reduced image. In a preferable method of displaying the image in a more recognizable manner, the stored image corresponding to the reduced image is displayed, the stored image is displayed in a size larger than that of the reduced image, or at least a part of the reduced image is enlarged and displayed.

Moreover, since the second display control means displays the stored image corresponding to the reduced image indicated by the indication means, the image can be confirmed with a non-reduced stored image.

Additionally, since the second display control means displays any one of the images to be displayed in the display, it is unnecessary simultaneously to display another image or to reduce the display screen. The image can be displayed in a large size fully in the display, and can easily be confirmed.

Moreover, since an indicator for changing the image to be displayed in the display is displayed, the displayed large image can successively be changed. All the images are easily confirmed in the large screen.

Furthermore, since the image processing apparatus further includes display changeover means for successively automatically changing the image to be displayed in the display, an operation of performing a changeover instruction can be omitted during confirmation of the image.

Additionally, the image processing apparatus further comprises execution instruction means for instructing the specific image processing to be actually performed in the image displayed in the display by the second display control means, and the execution means executes the specific image processing on the image for which the execution is instructed by the execution instruction means. Therefore, while seeing the large image, the image processing can actually be performed on the image to be actually processed.

Moreover, since the printing processing is performed as the specific image processing, the performing of an unnecessary printing is reduced. Particularly, in recent years, by a printer, the image can be printed with a resolution much higher than a display resolution of the system. Characteristics which cannot easily be recognized during confirmation with the reduced image remarkably appear in the printed image. Therefore, the present invention is effectively applied during the printing processing.

Moreover, since the image processing apparatus includes edition operation acceptance means for accepting the user's operation, the printing processing smoothly flows and the apparatus is conveniently used.

Furthermore, the mail transmission processing is performed as the specific image processing. Therefore, for example, when the image is transmitted via e-mail, a troublesome operation of starting another application to confirm the image during preparation of a new mail can be omitted, and the apparatus is conveniently used.

Additionally, the apparatus includes mail preparation control means for controlling the apparatus in such a manner that a new mail preparation processing of attaching the image indicated to be mailed/transmitted is performed during the mail transmission processing. Therefore, the processing can smoothly shift to the processing of preparing the new mail.

Moreover, a transfer processing of transferring the stored image to a desired storage region is performed as the specific image processing. Therefore, an operation of starting another application to confirm the image to be transferred and transferring the desired image after confirmation is not required. Therefore, the intricate operation can be omitted and the apparatus is conveniently used.

Moreover, for the storage medium of the digital camera, the number of frames of stored images is limited. Therefore, an operation of transferring the image to the computer is frequently performed, and further there are many opportunities for performing the printing or another operation. In a use mode in which the storage medium is included in the digital camera, particularly a user's operation property can be enhanced.

The present invention is not limited to the aforementioned embodiments, and various modifications are possible within the scope claimed in the following claims.

What is claimed is:

1. An image processing apparatus comprising:
   at least one CPU and a memory cooperatively coupled to function as:
   an obtaining unit adapted to obtain images stored in a storage medium;
   a display control unit adapted to control so that the images obtained by said obtaining unit are automatically and sequentially displayed as a slideshow in a single display manner;
   a receiving unit adapted to receive, during the slideshow displayed by said display control unit, an indication regarding an image displayed in the slideshow by a user designating at least one indicated image as an image to be subjected later to a specific image processing;
   a storing unit adapted to store information indicating the image being displayed in the slideshow at a time point when the indication is received, wherein in a case where indications are received respectively for a plurality of images during the slideshow, the storing unit stores information indicating images which are displayed at time points when the respective indications are received during the slideshow; and
   a control unit adapted to effect control so as to display a screen for performing the specific image process to the plurality of images indicated by the information stored by said storing unit, after completion of the slideshow, on the basis of the information stored by said storing unit.

2. The image processing apparatus according to claim 1, wherein the specific image process is a print process of the image.

3. The image processing apparatus according to claim 2, wherein said screen is a print process screen on which images indicated by the information stored by said storing unit are displayed.

4. The image processing apparatus according to claim 2, wherein the screen is a print process screen on which a print execution button is displayed.

5. The image processing apparatus according to claim 1, wherein said control unit effects the control so as to activate an application software for executing the specific image process and display a screen for executing the application software.

6. The image processing apparatus according to claim 5, wherein said control unit passes the information stored by said storing unit to the application software.

7. The image processing apparatus according to claim 1, wherein the specific image process is a transfer process of a mail of an image.

8. The image processing apparatus according to claim 7, wherein said control unit effects the control so as to activate an application software for transferring the mail and display a mail screen of the mail to which images indicated by the information stored by said storing unit are added.

9. The image processing apparatus according to claim 1, wherein the specific image process is a transfer process of the image.

10. The image processing apparatus according to claim 1, wherein the information stored by said storing unit is a file path name of an image file.

11. The image processing apparatus according to claim 1, wherein said display control unit displays each individual image in a full screen in the slideshow.

12. The image processing apparatus according to claim 1, wherein said display control unit effects control so as to display, before the slideshow is displayed, a plurality of small images of a size smaller than that of an image displayed in the slideshow and displays, in the slideshow, images corresponding to those ones of the small images selected by the user from among the plurality of small images.

13. An image processing method comprising:
   an obtaining step of obtaining images stored in a storage medium;
   a display control step of controlling so that the images obtained in said obtaining step are automatically and sequentially displayed as a slideshow in a single display manner;
   a receiving step of receiving, during the slideshow displayed in said display control step, an indication regarding an image displayed in the slideshow by a user designating at least one indicated image as an image to be subjected later to a specific image processing;
   a storing step of storing information indicating at least one image displayed in the slideshow at a time point when the indication is received, wherein in a case where indications are received respectively for a plurality of images during the slideshow, the storing step stores information indicating those ones of the images which are displayed at time points when the respective indications are received during the slideshow; and
   a control step of effecting control so as to display a screen for performing the specific image process to images indicated by the information stored in said storing step, after completion of the slideshow, on the basis of the information stored in said storing step.

14. A non-transitory computer-readable storage medium storing a program to cause a computer to perform an image processing method comprising:
   an obtaining step of obtaining images stored in a storage medium;
   a display control step of controlling so that the images obtained in said obtaining step are automatically and sequentially displayed as a slideshow in a single display manner;

a receiving step of receiving, during the slideshow displayed in said display control step, an indication regarding an image displayed in the slideshow by a user designating at least one indicated image as an image to be subjected later to a specific image processing;

a storing step of storing information indicating at least one image displayed in the slideshow at a time point when the indication is received, wherein in a case where indications are received respectively for a plurality of images during the slideshow, the storing step stores information indicating those ones of the images which are displayed at time points when the respective indications are received during the slideshow; and a control step of effecting control so as to display a screen for performing the specific image process to images indicated by the information stored in said storing step, after completion of the slideshow, on the basis of the information stored in said storing step.

* * * * *